2,807,832

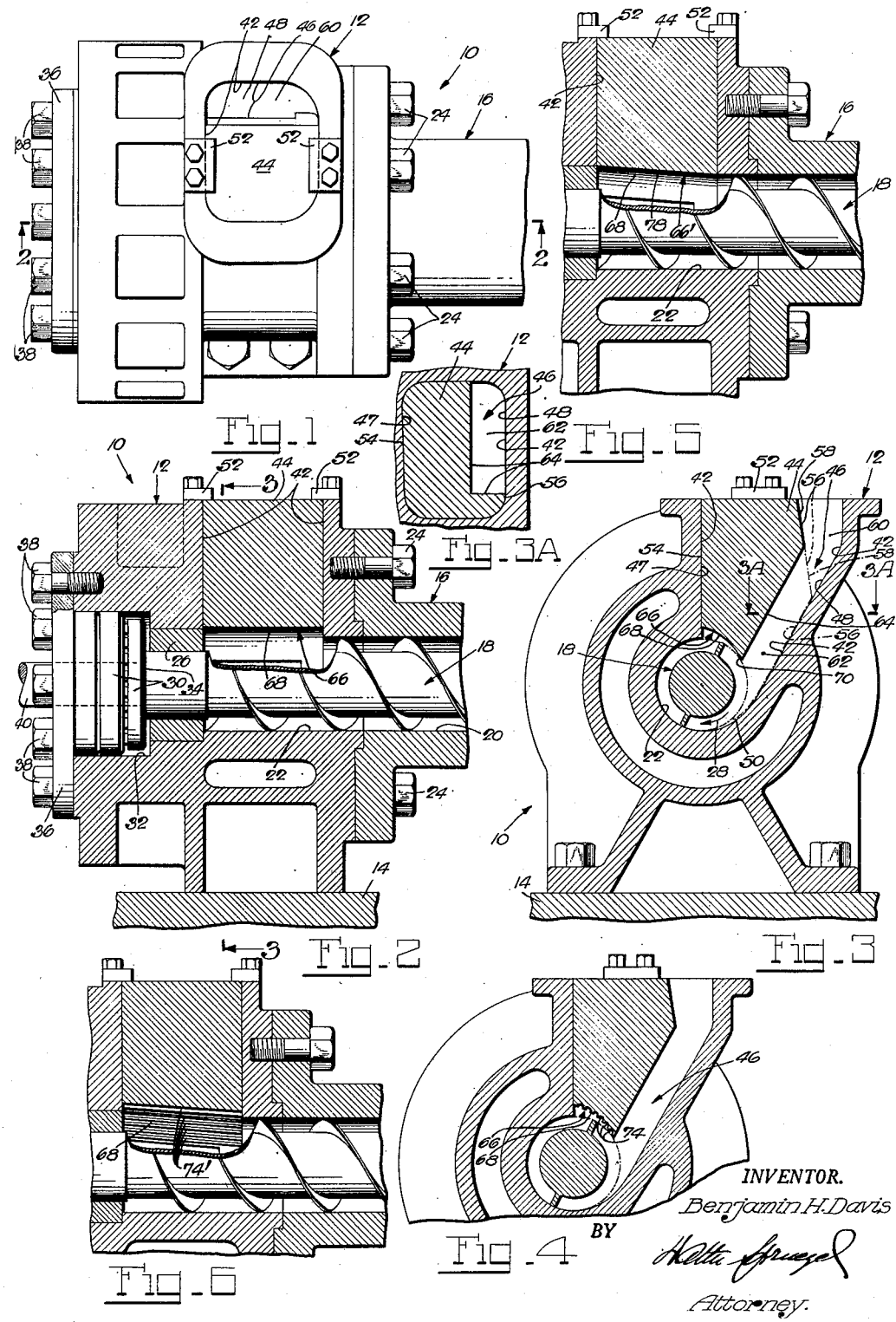

STOCK FEED CONTROL FOR EXTRUSION APPARATUS

Benjamin H. Davis, Noank, Conn., assignor to The Standard Machinery Company, Mystic, Conn., a corporation of Connecticut Application January 31, 1955, Serial No. 485,102

11 Claims. (Cl. 18—12)

This invention relates to extrusion apparatus in general, and to stock feed controls therefor in particular.

The present invention is concerned with the feed into extrusion apparatus of rubber or rubber-like plastics especially, though not exclusively, in ribbon form, hereinafter referred to as "stock." Stock of this kind is customarily fed through the throat of a hopper into one end of an extrusion cylinder wherein the usual feed screw works the stock while forcing the same ahead in the cylinder toward and through an extrusion die at the other end thereof. The throat of the hopper, which is usually quite wide to permit ready access by an operator to the cylinder bore and feed screw therein while the apparatus is idle for the correction of any abnormal operating condition or for any other purpose, is by a removable block therein usually closed except for a passage through which stock is led into the cylinder bore, thereby to prevent as much as possible regurgitation of the stock from the feed screw into the throat of the hopper in the first place, and also keep an operator's hand out of harm's way of the driven feed screw. Further to prevent regurgitation of the stock in the lead-in passage to the cylinder bore due to obstructions in its path into the feed screw, this passage usually has a curving approach to the cylinder bore and leads substantially tangentially into the latter so as to guide the stock directly into the feed screw with the least impediment. Despite these provisions, more or less frequent regurgitation of the stock in the lead-in passage to the cylinder bore due to other uncontrollable factors, such as varying thickness or varying consistency of the stock, for instance, is unavoidable and often causes interruption of the required uniform stock feed into the screw with ensuing adverse effects on the extruded product or products. To alleviate this condition, recourse has heretofore been had to a pin wheel and a drive control therefor, of which the former is located above the hopper and stock is passed thereover for its guidance at a controlled rate into the lead-in passage to the cylinder bore, while the drive control is responsive to regurgitation of stock in the lead-in passage to slow down or stop the pin wheel and, hence, the stock passed thereover, until the stock regurgitation has subsided.

It is the primary aim and object of the present invention to make provisions in extrusion apparatus for preventing altogether regurgitation of fed stock therein into the lead-in passage to the cylinder bore from any cause whatever, thereby to dispense with the aforementioned speed-controlled pin wheel or other costly special stock-feed control equipment.

It is another object of the present invention to achieve in extrusion apparatus non-regurgitation of stock in the lead-in passage to the cylinder bore by merely making a slight change on one of the standard parts of the apparatus and without requiring any special part or parts in addition to the standard parts thereof, thereby adding this important non-regurgitation feature to the apparatus with hardly any increase in the cost of the latter.

It is a further object of the present invention to achieve in extrusion apparatus non-regurgitation of stock in the lead-in passage to the cylinder bore, by confining any stock regurgitation from the cylinder bore from any cause whatever to a relief recess in the latter which extends at least throughout the full expanse of the lead-in passage longitudinally of the cylinder but is out of direct communication therewith, and is in the direction of rotation of the passing periphery of the feed screw of progressively decreasing depth preferably all the way to the cylinder bore, thereby to cam regurgitating stock in this relief recess back into the feed screw rather than permit any appreciable progress of this stock toward the lead-in passage.

Another object of the present invention is to enhance the aforementioned action of the relief recess in the cylinder bore to cam regurgitating stock therein back into the feed screw, by providing the bottom surface of the relief recess with peripherally spaced shoulders which are in the path of stock tending to escape from this recess other than into the feed screw.

A further object of the present invention is to enhance even further the aforementioned action of the relief recess in the cylinder bore to cam regurgitating stock therein back into the feed screw, by arranging the relief recess so that the same is of progressively decreasing depth, preferably all the way to the cylinder bore, in the direction of stock feed of the screw also, thereby providing for additional guidance of regurgitating stock in the recess back into the feed screw longitudinally thereof and affording the stock greater freedom of motion in this recess with ensuing optimum effect of the latter on this stock in camming the same back into the feed screw.

It is another object of the present invention to provide the aforementioned relief recess in the cylinder bore most conveniently by simply undercutting the inner surface of the usual removable filler block for the hopper throat.

It is a further object of the present invention to achieve the aforementioned progressive decrease in the depth of the relief recess in the cylinder bore peripherally thereof most conveniently by simply forming the aforementioned inner surface of the usual filler block for the hopper throat eccentrically with respect to the cylinder bore.

Another object of the present invention is to provide the aforementioned shoulders on the bottom surface of the relief recess conveniently by simply providing the eccentric inner surface of the filler block for the hopper throat with peripherally spaced longitudinal grooves.

Other objects and advantages will appear to those skilled in the art from the following, considered in conjunction with the accompanying drawings.

In the accompanying drawings, in which certain modes of carrying out the present invention are shown for illustrative purposes:

Fig. 1 is a fragmentary top view of extrusion apparatus embodying the present invention;

Fig. 2 is a longitudinal section through the extrusion apparatus, taken substantially on the line 2—2 of Fig. 1;

Fig. 3 is a cross-section through the extrusion apparatus as taken on the line 3—3 of Fig. 2;

Fig. 3A is a fragmentary section through the extrusion apparatus as taken on the line 3A—3A of Fig. 3;

Fig. 4 is a fragmentary cross-section through extrusion apparatus embodying the present invention in a modified manner;

Fig. 5 is a fragmentary longitudinal section through extrusion apparatus embodying the present invention in another modified manner; and Fig. 6 is a fragmentary longitudinal section through extrusion apparatus embodying the present invention in a further modified manner.

Referring to the drawings, and more particularly to Figs. 1 to 3 thereof, the reference numeral 10 designates extrusion apparatus which comprises a hopper 12 on any suitable support 14, an extrusion cylinder 16 and a feed screw 18 in the cylinder bore 20 and continuing bore 22 in the hopper 12. The cylinder 16, which is suitably secured, as by bolts 24, for instance, to the adjacent end of the hopper 12, carries at its forward end the usual extrusion die (not shown). The feed screw 18 is suitably journalled in a bushing 26 in the hopper 12, and is adapted to be driven, in the direction of the arrow 28 in Fig. 3, for the forward feed of stock in the cylinder toward and through the extrusion die thereon. The rear thrust of the feed screw 18, resulting from the forward feed by the same of stock in the cylinder 16, is taken up by a thrust bearing 30 in a recess 32 in the hopper 12, an annular shoulder 34 on the feed screw 18 being to that end in abutment with the bearing 30 while the latter is retained in the recess 32 by a plate 36 which may be bolted to the hopper 12 as at 38. A reduced shank 40 of the feed screw 18 may extend trrough the bearing 30 and retainer plate 36 (Fig. 2) and be coupled to any suitable prime mover (not shown) for the uni-directional drive of the feed screw.

The hopper 12 is provided with a throat 42 which extends to the bore 22 in the hopper and is customarily of general wedge shape (Fig. 3). The throat 42, which is usually made quite wide to permit ready access by an operator to the cylinder bore and feed screw therein while the apparatus is idle for the correction of any abnormal operating condition or for any other purpose, customarily receives a filler block 44 which closes the throat 42 except for a stock passage 46 therein to the bore 22 in the hopper. The filler block 44 serves primarily to prevent as much as possible regurgitation of stock from the bore 22 into the throat 42 of the hopper and instead confine the stock in this bore when the apparatus is performing, and serves also to limit the width of the stock passage 46 so as to keep an operator's hand out of harm's way of the driven feed screw 18.

In order to guide supply stock through the passage 46 in the hopper 12 into the feed screw 18 with the least impediment and thereby avoid stock regurgitation in this passage due to obstructions in the stock's path into the feed screw, the passage 46 usually leads substantially tangentially into the bore 22 in the hopper (Fig. 3), and the side 48 of the throat 42 is customarily given the curving approach 50 to the bore 22 so that the constantly infed supply stock is distributed over a maximum peripheral range of the feed screw.

As shown in Figs. 1 to 3, the filler block 44 is fittedly received and seated in the throat 42 of the hopper 12, and is in any suitable manner releasably retained therein, as by bolted clamping members 52 on the hopper, for instance. For its fitted reception in and seating engagement with the generally wedge-shaped throat 42, the filler block 44 is of the same length as the latter (Figs. 1 and 2) and its opposite sides 54 and 56 are arranged in the same relative slanting fashion as the adjacent sides 47 and 48, respectively, of the throat (Figs. 3 and 3A). As shown in full and dot-and-dash lines in Fig. 3, an upper part of the side 56 of the filler block 44 recedes at 58 inwardly in the throat 42 to form together with the adjacent side 48 of the latter an upper part 60 of the stock passage 46 (see also Fig. 1). The continuing lower part 62 of the stock passage 46 is formed by a recess 64 in the side 56 of the filler block 44 and the adjacent side 48 of the throat 42 (Figs. 3 and 3A).

The instant hopper arrangement is adapted for the feed into the extrusion apparatus of rubber or rubber-like plastics particularly, though not exclusively, in ribbon form. To obtain an extruded product or products without any defect or defects, it is imperative that the feed screw 18 constantly delivers stock of the same consistency and at the same flow rate to the extrusion die throughout the cross-sectional area of its aperture, and to achieve this in the first place it is equally imperative that the supply stock is fed into the extrusion apparatus constantly and at a uniform rate. Constant feed of supply stock at uniform rate into the extrusion apparatus is, of course, seriously hampered by any stock regurgitation in the passage 46. While the aforementioned provisions of the filler block 44 and the substantially tangential lead of the throat side 48 into the hopper bore 22 do prevent continuous stock regurgitation in the passage 46 due to the restriction of the throat to the cross-sectional dimensions of this passage and the substantially non-impeded path of the supply stock into the feed screw, these provisions have proved inadequate to prevent more or less frequent stock regurgitation in the passage 46 from other unavoidable causes, such as varying thickness or varying consistency of the stock, and especially ribbon stock, for instance, with ensuing adverse effects on the extruded product or products.

To prevent altogether stock regurgitation in the passage 46 from any cause whatever, the bore 22 in the hopper is, in accordance with the present invention, provided with a relief recess 66 which, in the present instance, is formed in the hopper throat 42 by the inner surface 68 of the filler block 44 (Figs. 2 and 3). This inner block surface 68 extends throughout the expanse of the throat 42 longitudinally of the cylinder 16 (Fig. 2), wherefore the relief recess 66 extends at least throughout the longitudinal expanse of the stock passage 46 (Figs. 3 and 3A). The inner block surface 68 is throughout its longitudinal extent spaced progressively closer from the hopper bore 22 in the direction of rotation of the passing periphery of the feed screw 18 and merges at 70 with the hopper bore to form a complementary part of the same (Fig. 3), so that the relief recess is generally wedge-shaped and is effectively spaced and separated from the stock passage 46 by a part of the hopper bore 22 formed by the complementary part 70 of the block surface 68. Preferably, the inner block surface 68 is throughout its longitudinal extent cross-sectionally curved eccentrically with respect to the hopper bore 22 so that the relief recess 66 is throughout of gradually varying depth peripherally of the hopper bore 22. Further, while the inner block surface 68 may be formed so as to merge with the hopper bore 22 some distance away from the stock passage 46, it is preferably so formed that this merger occurs in close proximity to the stock passage (Fig. 3) to obtain a relief recess 66 of optimum peripheral extent and, hence, volume for any given varying depth of the latter and any given dimensions of the throat 42, filler block 44 and stock passage 46.

Supply stock freshly fed through the passage 46 into the feed screw 18, if regurgitating in the latter from any cause whatever, is urged by the driven screw and the following stock therein to exert itself primarily in the direction of rotation of the screw, i. e. toward the recess 66 (Fig. 3) which in any event is sufficiently close to the regurgitating stock to offer relief to the excess portion thereof until the regurgitation has subsided. Thus, given the proper volume, the recess 66 will under normal operating conditions effectively relieve all regurgitation of stock in the feed screw 18 in the vicinity of the passage 46 and prevent the back-up of stock into the latter to an extent where it would interfere with the continuous feed of stock through this passage into the feed screw. To achieve relief of stock regurgitation in the feed screw 18 by the recess 66 anywhere within the longitudinal extent of the passage 46 and thus effectively keep regurgitating stock out of the latter, the relief recess 66 extends at least throughout the longitudinal extent of the passage 46, as explained.

While the relief recess 66 absorbs the excess stock in the feed screw 18 on stock regurgitation therein, it is essential for satisfactory performance of the extrusion apparatus that this absorbed stock be moved back into the feed screw by excess stock forced into the relief recess on the next stock regurgitation, rather than be permitted to become permanently trapped in this recess. This is achieved by the generally wedge-shaped form of the relief recess 66, the bottom surface 68 of which effectively cams excess stock therein, while being replaced by new excess stock, back into the feed screw. Thus, there takes place in the relief recess 66 almost constant replacement of stock, at a lower rate and under lower pressure between stock regurgitations and at a higher rate and under higher pressure during stock regurgitation, as will be readily understood. However, the volume of the relief recess 66 is so selected that it will under all but the most abnormal operating conditions of the extrusion apparatus effectively relieve all stock regurgitation in the feed screw despite the somewhat higher pressure of the stock passing through the relief recess when stock regurgitation takes place. On the other hand, the slant of the bottom surface 68 of the relief recess 66 relative to the hopper bore 22 (Fig. 3) must be sufficiently moderate in order to have the aforementioned effective cam action on the stock therein. Also, to insure quickest replacement of all the stock in the relief recess 66, its bottom surface 68 preferably merges into the cylinder bore as aforementioned. However, it is fully within the scope of the present invention to stop the slant of the bottom surface 68 of the relief recess 66 short of merger with the hopper bore 22 and continue this surface 68 in substantially radial fashion to the latter. It is also within the scope of the present invention to form the bottom surface 68 of the relief recess 66 so that the latter is of progressively decreasing depth only over a part of its peripheral extent including its end next to the stock passage 46.

To enhance the aforementioned stock-camming action of the slanting bottom surface 68 of the relief recess 66, the same may appropriately be provided with preferably several peripherally spaced longitudinal grooves 74 (Fig. 4). These grooves 74 are relatively shallow so as not permanently to entrap stock therein but rather redirect such stock out therefrom in a path substantially radially of the hopper bore 22. To this end, the grooves 74 are preferably curved cross-sectionally as shown in Fig. 4. Thus, the sidewalls of these grooves which are in the path of stock moving in the relief recess 66 toward the stock passage 46 act as shoulders which guide the confronting stock toward the feed screw 18 and thus effectively augment the stock-camming action of the bottom surface 68 of the relief recess.

The aforementioned stock-camming action of the bottom surface 68 of the relief recess may also be enhanced by slanting the same not only peripherally as in Fig. 3, but also longitudinally as at 78 in Fig. 5. Thus, the driven screw 18 and stock fed thereby have a tendency to urge excess stock in the relief recess 66' (Fig. 5) in the direction of the forward stock feed, and the peripherally and longitudinally slanting bottom surface 68 will cam excess stock in the relief recess back into the feed screw not only peripherally of the latter but longitudinally thereof as well. Preferably, the longitudinal slant of the bottom surface 68 is continuous throughout and extends all the way to the hopper bore 22 as clearly shown in Fig. 5.

Optimum stock-camming action of the bottom surface of the relief recess is achieved by the arrangement shown in Fig. 6 in which the bottom surface 68 slants not only peripherally but longitudinally as well, and is further provided with peripherally spaced longitudinal grooves 74' of preferably curved cross-section.

While the relief recess has herein been described as defined in the hopper throat 42 by the inner surface of the filler block therein, it is, of course, fully within the purview of the present invention to form the filler block as an integral part of the hopper, in which case the relief recess would be provided directly in the hopper bore, as by undercutting the same thereat, for instance. Also, while only one relief recess has been provided in the exemplary extrusion apparatus shown and described, it is fully within the purview of the present invention to provide in extrusion apparatus a plurality of relief recesses spaced peripherally from each other. Of course, the exemplary formation of the relief recess in the conventional hopper throat by the inner surface of the removable filler block therein is advantageous from the standpoint of permitting ready replacement of a conventional filler block in existing extrusion apparatus with the instant filler block, and thereby eliminate to all practical intents and purposes stock regurgitation in the stock passage to the feed screw of the apparatus at very little cost.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In extrusion apparatus, the combination of a cylinder having a longitudinal bore and a stock passage leading laterally into said bore over part of its periphery; and a rotary screw in said bore operable in one direction to feed stock therein away from said passage, said cylinder having in its bore a relief recess extending at least throughout the full expanse of said passage longitudinally of the cylinder and being spaced from said periphery part of said bore peripherally thereof, and said recess being of progressively decreasing depth peripherally of said bore in said one direction.

2. In extrusion apparatus, the combination of a cylinder having a longitudinal bore and a stock passage leading laterally into said bore over part of its periphery; and a rotary screw in said bore operable in one direction to feed stock therein away from said passage, said cylinder having in its bore a relief recess with its bottom surface facing said screw, said recess extending at least throughout the full expanse of said passage longitudinally of the cylinder and being spaced from said periphery part of said bore peripherally thereof, and said bottom surface being spaced gradually closer from said bore peripherally thereof in said one direction and merging with the latter.

3. In extrusion apparatus, the combination of a cylinder having a longitudinal bore and a stock passage leading into said bore laterally thereof; and a rotary screw in said bore operable in one direction for the forward feed of stock therein away from said passage, said cylinder having in its bore a relief recess extending at least throughout the full expanse of said passage longitudinally of the cylinder and being spaced therefrom peripherally of said bore, and said recess being of progressively decreasing depth peripherally of said bore in said one direction and also longitudinally of said bore in said forward feed direction.

4. In extrusion apparatus, the combination of a cylinder having a longitudinal bore and a stock passage leading into said bore laterally thereof; and a rotary screw in said bore operable in one direction for the forward feed of stock therein away from said passage, said cylinder having in its bore a relief recess with its bottom surface facing said screw, said recess extending at least throughout the full expanse of said passage longitudinally of the cylinder and being spaced therefrom peripherally of said bore, and said bottom surface being spaced gradually closer from said bore peripherally thereof in said one direction and also longitudinally thereof in said forward feed direction and merging with said bore peripherally as well as longitudinally thereof.

5. In extrusion apparatus, the combination of a cylinder having a longitudinal bore and a stock passage leading into said bore laterally thereof; and a rotary screw in said bore operable in one direction to feed stock therein away from said passage, said cylinder having in its bore a relief recess with its bottom surface facing said screw, said recess extending at least throughout the full expanse of said passage longitudinally of the cylinder and being spaced therefrom peripherally of said bore, and said bottom surface being spaced progressively closer from said bore peripherally thereof in said one direction and having shoulder means in the path of stock moving in said recess in said one direction.

6. The combination in extrusion apparatus as set forth in claim 5, in which said bottom surface is spaced gradually closer from said bore peripherally thereof in said one direction and merges with the latter, and said shoulder means is formed by peripherally spaced longitudinal grooves in said bottom surface.

7. In extrusion apparatus, the combination of a cylinder having a longitudinal bore and a stock passage leading into said bore laterally thereof; and a rotary screw in said bore operable in one direction for the forward feed of stock therein away from said passage, said cylinder having in its bore a relief recess with its bottom surface facing said screw, said recess extending at least throughout the full expanse of said passage longitudinally of the cylinder and being spaced therefrom peripherally of said bore, and said bottom surface being spaced progressively closer from said bore peripherally thereof in said one direction and also longitudinally thereof in said forward feed direction and having shoulder means in the path of stock moving in said recess in said one direction.

8. The combination in extrusion apparatus as set forth in claim 7, in which said bottom surface is spaced gradually closer from said bore peripherally thereof in said one direction and also longitudinally thereof in said forward feed direction and merges with said bore peripherally as well as longitudinally thereof, and said shoulder means is formed by peripherally spaced longitudinal grooves in said bottom surface.

9. A hopper assembly for extrusion apparatus with a cylinder and feed screw therein, comprising a receptacle having a longitudinal bore and a throat leading laterally into said bore, as well as means on one end for mounting a cylinder thereon in line with said bore; and a block removably mounted in said throat, said block being of smaller cross-sectional area than said throat to define therein a restricted stock passage leading substantially tangentially into said bore, and having an inner surface facing said bore and extending at least throughout the full expanse of said passage longitudinally of said bore, said inner block surface being at least over part of its expanse peripherally of said bore spaced progressively closer from the latter toward said stock passage and merging with said bore to form a relief recess in the latter.

10. A hopper assembly for extrusion apparatus with a cylinder and feed screw therein as set forth in claim 9, in which said inner block surface is at least throughout said longitudinal expanse of said passage also spaced progressively closer from said bore longitudinally thereof toward said one receptacle end and merges with said bore.

11. A hopper assembly for extrusion apparatus with a cylinder and feed screw therein as set forth in claim 9, in which said inner block surface is over said part of its expanse peripherally of said bore provided with shoulder means in the path of stock moving in said relief recess toward said passage.

References Cited in the file of this patent
UNITED STATES PATENTS
1,645,157     Royle _____ Oct. 11, 1927